United States Patent
Prams

(10) Patent No.: US 9,879,745 B2
(45) Date of Patent: Jan. 30, 2018

(54) AIR SPRING COMPRISING LEVEL-MEASURING DEVICE INTEGRATED INTO THE BELLOWS

(71) Applicant: KNORR-BREMSE Systeme fuer Nutzfahrzeuge GmbH, Munich (DE)

(72) Inventor: Stefan Prams, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 14/980,440

(22) Filed: Dec. 28, 2015

(65) Prior Publication Data

US 2016/0195151 A1 Jul. 7, 2016

Related U.S. Application Data

(63) Continuation of application No. PCT/EP2014/062994, filed on Jun. 20, 2014.

(30) Foreign Application Priority Data

Jun. 26, 2013 (DE) .................. 10 2013 106 703

(51) Int. Cl.
*F16F 9/32* (2006.01)
*B60G 17/019* (2006.01)
(Continued)

(52) U.S. Cl.
CPC ............ *F16F 9/3292* (2013.01); *B60G 11/27* (2013.01); *B60G 17/019* (2013.01);
(Continued)

(58) Field of Classification Search
CPC .. B60G 11/27; B60G 17/019; B60G 17/0521; B60G 17/01908; B60G 2202/152;
(Continued)

(56) References Cited

U.S. PATENT DOCUMENTS

| 4,573,704 A | 3/1986 | VanDenberg et al. |
| 4,803,630 A * | 2/1989 | Takizawa ............. B60G 17/018 180/41 |

(Continued)

FOREIGN PATENT DOCUMENTS

| CN | 101228040 A | 7/2008 |
| CN | 102802972 A | 11/2012 |

(Continued)

OTHER PUBLICATIONS

Chinese-language Office Action issued in counterpart Chinese Application No. 201480036066.4 dated Oct. 31, 2016 with English translation (Thirteen (13) pages).

(Continued)

*Primary Examiner* — Thomas Irvin
(74) *Attorney, Agent, or Firm* — Crowell & Moring LLP

(57) ABSTRACT

An air spring includes a cover, a base element and a flexible bellows clamped in a pressure-tight fashion between the cover and base element. A level-measuring device, integrated at least partially into the bellows, detects the height of the air spring. The level-measuring device has at least the following: a) at least one angle sensor which is integrated into the bellows, is connected at least in a rotationally fixed fashion to the cover or the base element and has an element which can rotate with respect to a base, b) a mechanical coupling, which is connected, at one end, to the rotatable element of the angle sensor and at the other end, to the cover or to the piston, such that when the height of the air spring changes an angle of at least one element of the mechanical coupling is changed and the angle sensor generates an angle signal which is dependent on the change in angle of the element, c) an evaluation device which assigns the angle signal originating from the angle sensor to a height level of the air spring.

16 Claims, 6 Drawing Sheets

(51) Int. Cl.
*B60G 17/052* (2006.01)
*F16F 9/05* (2006.01)
*B60G 11/27* (2006.01)

(52) U.S. Cl.
CPC ... *B60G 17/01908* (2013.01); *B60G 17/0521* (2013.01); *F16F 9/05* (2013.01); *B60G 2202/152* (2013.01); *B60G 2204/111* (2013.01); *B60G 2206/424* (2013.01); *B60G 2400/051* (2013.01); *B60G 2400/252* (2013.01)

(58) Field of Classification Search
CPC ........ B60G 2204/111; B60G 2206/424; B60G 2400/051; B60G 2400/252; F16F 9/05; F16F 9/3292
USPC .......................................... 267/64.27, 64.23
See application file for complete search history.

(56) References Cited

U.S. PATENT DOCUMENTS

| | | | | |
|---|---|---|---|---|
| 4,804,203 | A * | 2/1989 | Glab | B60G 17/019 280/5.514 |
| 4,838,563 | A * | 6/1989 | Konishi | B60G 17/019 180/41 |
| 5,046,754 | A * | 9/1991 | Kimura | B60G 17/017 280/6.152 |
| 5,859,692 | A * | 1/1999 | Ross, Jr. | B60G 17/01933 267/64.19 |
| 6,375,168 | B2 | 4/2002 | Behrends | |
| 6,516,657 | B2 * | 2/2003 | Shirato | B60G 7/04 73/117.01 |
| 6,568,665 | B2 * | 5/2003 | Foerster | B60G 17/01933 267/122 |
| 7,192,033 | B2 * | 3/2007 | Bolt | B60G 11/27 280/124.157 |
| 7,881,903 | B2 * | 2/2011 | Chen | G01G 19/12 702/174 |
| 9,446,650 | B2 * | 9/2016 | Willems | B60G 17/0157 |
| 2002/0008340 | A1 | 1/2002 | Behrends | |
| 2005/0077691 | A1 | 4/2005 | Witters | |
| 2006/0267296 | A1 * | 11/2006 | Dodd | B60G 11/27 280/5.512 |
| 2006/0267297 | A1 | 11/2006 | Nordmeyer et al. | |
| 2008/0054537 | A1 * | 3/2008 | Harrison | B60G 17/016 267/64.16 |
| 2012/0086178 | A1 | 4/2012 | Brookes et al. | |

FOREIGN PATENT DOCUMENTS

| | | |
|---|---|---|
| DE | 1 056 488 | 4/1959 |
| DE | 40 35 784 A1 | 6/1991 |
| DE | 198 03 750 A1 | 8/1998 |
| DE | 199 02 768 C1 | 9/2000 |
| DE | 100 17 562 C1 | 9/2001 |
| DE | 10 2004 038 239 A1 | 3/2006 |
| DE | 10 2008 028 916 A1 | 1/2010 |
| DE | 10 2008 028 917 A1 | 1/2010 |
| DE | 10 2008 028 917 B4 | 11/2010 |
| DE | 10 2008 028 916 B4 | 1/2012 |
| DE | 10 2011 108 249 A1 | 1/2013 |

OTHER PUBLICATIONS

International Search Report (PCT/ISA/210) issued in PCT Application No. PCT/EP2014/062994 dated Aug. 20, 2014 with English translation (Six (6) pages).

German-language Office Action issued in counterpart German Application No. 10 213 106 703.4 dated May 15, 2014 (Seven (7) pages).

International Preliminary Report on Patentability (PCT/IB/326 & PCT/IB/373) issued in PCT Application No. PCT/EP2014/062994 including English translation of Written Opinion (PCT/ISA/237) dated Jan. 7, 2016 (Six (6) pages).

* cited by examiner

AIR SPRING COMPRISING LEVEL-MEASURING DEVICE INTEGRATED INTO THE BELLOWS

CROSS REFERENCE TO RELATED APPLICATIONS

This application is a continuation of PCT International Application No. PCT/EP2014/062994, filed Jun. 20, 2014, which claims priority under 35 U.S.C. §119 from German Patent Application No. 10 2013 106 703.4, filed Jun. 26, 2013, the entire disclosures of which are herein expressly incorporated by reference.

BACKGROUND AND SUMMARY OF THE INVENTION

The invention relates to an air spring having a cover, a base element and having flexible bellows which are clamped in a pressure-tight fashion between the latter, and having a level-measuring device which is integrated at least partially into the bellows and has the purpose of sensing the level of the air spring.

In order to ensure that there is an identical setpoint level of the body in different load states in vehicles with an air spring device and air springs, a means for regulating the level of the body is present. For this purpose, knowledge of the actual level of the vehicle body or of the level of the air springs arranged between the vehicle body and the axles is necessary, level-measuring devices which are integrated into the air bellows being known from the prior art because of a certain lack of sensitivity for external conditions and for ease of mounting.

DE 10 2008 028 916 B4 proposes a device for sensing a level of bellows in which a sensing device is arranged in the interior of the air bellows, which device senses the position of a rolling fold of the air bellows which is formed on the outside of the air bellows, and modulates a position-dependent signal. It is disadvantageous that the formation of the rolling fold does not necessarily behave linearly with spring compression and that, owing to the external sensing of the rolling fold, sealing problems can occur at the air bellows.

DE 100 17 562 C1 proposes a height sensor which is integrated into the air bellows and has a length-variable winding and a coil. An alternating voltage is applied to the coil, which also brings about an induced electrical voltage in the winding owing to the magnetic field which is generated as a result. This voltage is evaluated in an evaluation unit and forms a measure of the distance of the cover from the piston.

DE 10 2008 028 917 B4 proposes a device for sensing a dynamic change in pressure in the air spring during spring compression, wherein the level is determined as a function of the static pressure and the dynamic change in pressure.

DE 40 35 784 A1 proposes coil-shaped conductive conductor tracks in the wall of the air spring bellows of an air spring. In this context, in the case of spring compression, a change in the inductance of these coil-shaped conductor tracks is evaluated electronically, and the spring compression is determined on the basis thereof.

However, the abovementioned approaches have disadvantages with respect to general conditions such as severely changing temperatures, oil-containing and particle-containing surroundings, pressure fluctuations, tight installation space, reproducibility, etc.

In view of the above, the invention is based on the object of making available an air spring having a level-measuring device which is integrated at least partially into the bellows, wherein precise measurement of the level can take place in the simplest and most robust way possible.

According to the invention, the level-measuring device includes:

at least one angle sensor which is integrated into the bellows and which is connected at least in a rotationally fixed fashion to the cover or to the base element and has an element which can rotate with respect to a base, a mechanical coupling which is connected, on the one hand, to the rotatable element of the angle sensor and, on the other hand, to the cover or to the base element such that when the level of the air spring changes, an angle of at least one element of the mechanical coupling is changed, and the angle sensor generates an angle signal which is dependent on the change in angle of the element, and an evaluation device by which the angle signal which originates from the angle sensor is assigned to a level of the air spring.

In other words, a change in the vertical relative level positions of the cover and the base element by way of the kinematics of the mechanical coupling between the rotational angle sensor and the cover or base element is converted into a change of the angular position of the rotatable element of the angle sensor. The result is that the respectively assumed angular position of the rotatable element forms a measure of the spring compression or spring extension or of the change in length of the air spring.

The at least rotationally fixed connection of the angle sensor to the cover or to the base element therefore has its rotational rigidity with respect to a rotational axis of the rotatable element of the rotational angle sensor.

Such determination of the level which is made by way of a mechanical coupling between the rotational angle sensor and the cover or the base element is robust since it is relatively insensitive to changes in temperature, for example. There is also a certain degree of insensitivity to an environment containing oil or particles. However, it is decisive that each determined rotational angle or pivoting angle of the rotatable element of the angle sensor can be assigned a uniquely defined level of the air spring.

According to the invention, the term "level" is understood to mean: (i) the distance of the cover from a surface, lying opposite, of the base element of the air spring (for example, a piston face of a piston), (ii) the length of the air spring viewed in the direction of a vertical central axis of the air spring, or (iii) a distance of an axle of a vehicle from the vehicle body, depending on which of the specified variables appears more suitable for further use, for example within the scope of a level-regulating algorithm.

In this context, the evaluation device can be arranged inside or outside the air spring or the bellows.

Advantageous developments and improvements of the invention are described and claimed herein According to one preferred embodiment, the mechanical coupling contains at least one element which is guided in a sliding fashion by one of its ends in a guide on the base element or on the cover and is connected by its other end to the rotational element of the angle sensor, in such a way that when the level of the air spring changes, the one end of the element is moved along the guide, and the other end activates the rotational element of the angle sensor. In this context, the guide can be a linear longitudinal guide which is arranged in a plane perpendicular to a central axis of the air spring.

This embodiment is advantageous in terms of its robustness, because it can be implemented very easily with just a single rod-shaped element, in particular if the guide is a sliding guide.

According to a further embodiment, the mechanical coupling contains a scissor mechanism, with at least two scissor elements which are connected to one another in an articulated fashion. One end of a first scissor element is connected to the rotational element of the angle sensor, and one end of a second scissor element is coupled via a linkage to the base element or to the cover in such a way that when the level of the air spring changes, the scissor mechanism lengthens or shortens in the direction of the central axis of the air spring, and the second scissor element rotates about the linkage, and the first scissor element activates the rotational element of the angle sensor. In this context, the scissor mechanism can contain intersecting and/or non-intersecting scissor elements.

According to a further embodiment, the mechanical coupling contains a telescopic device which is coupled by one of its ends to the cover or to the base element by way of a linkage and is connected by its other end to the rotational element of the angle sensor in such a way that when the level of the air spring changes with lengthening or shortening of the telescopic device, the one end rotates about the linkage and the other end activates the rotational element of the angle sensor. In this context, the telescopic device can contain at least two telescopic elements which can be slid relative to one another with a longitudinal degree of freedom.

The advantage of this embodiment is, in turn, the simplicity of its design with at minimum only two telescopic elements which can be slid in one another or on one another, and just one linkage to the cover or to the base element.

The evaluation device is particularly advantageously integrated into the bellows and arranged on the cover. The evaluation device is then also accommodated in a way which is protected against outside influences such as dirt and moisture. Furthermore, the air spring then forms, together with the assigned level-measuring device, a unit which is ready for installation and easy to mount.

The angle sensor can be placed at any desired position in the interior of the bellows and can be adapted to the conditions of the mechanical coupling. In particular, the angle sensor is arranged centrally or eccentrically with respect to a central axis of the air spring.

The rotational element of the angle sensor can interact in a contactless fashion or by way of contact with the base. An example of an interaction of the rotational element with the base by way of contact is a rotational potentiometer in which the rotational element is composed of a rotational slide which interacts with a conductor track and in which the electrical resistance changes in a measurable fashion with the rotational angle. Examples of contactless interaction of the rotational element with the base are a Hall element, inductive rotational angle sensor and rotational angle sensor according to the incremental transmitted light method.

According to one development, the rotational axis of the rotational element of the rotational angle sensor can be arranged perpendicular with respect to a plane which contains the central axis of the air spring.

The invention also relates to an air suspension device for a vehicle containing at least one air spring as described above.

In such an air suspension device for a vehicle a valve arrangement is then provided by which a pressure medium is fed to or discharged from the bellows of the air spring as a function of the determined level of the at least one air spring, in order to set a predefined setpoint level. This valve arrangement is then controlled by an electronic level-regulating system.

Advantageous developments of the invention can be found in the patent claims, the description and the drawings. The advantages of features and of combinations of the plurality of features as specified in the introduction to the description are merely by way of example and can be effective alternatively or cumulatively without the advantages necessarily having to be achieved by embodiments according to the invention. Further features can be found in the drawings, in particular the illustrated geometries and the relative dimensions of a plurality of components with respect to one another and their relative arrangement and operative connection. Features of different embodiments of the invention or features of different patent claims can also be combined in a way which differs from the selected back-references of the patent claims, and are suggested herewith. This also relates to such features which are illustrated in separate drawings or mentioned in the description thereof. These features can also be combined with the features of different patent claims. Likewise, features which are disclosed in the patent claims can be omitted from other embodiments of the invention.

Other objects, advantages and novel features of the present invention will become apparent from the following detailed description of one or more preferred embodiments when considered in conjunction with the accompanying drawings.

BRIEF DESCRIPTION OF THE DRAWINGS

Identical or identically acting components and assemblies are each denoted by the same reference numbers in different embodiments.

DETAILED DESCRIPTION OF THE DRAWINGS

Figure 1:
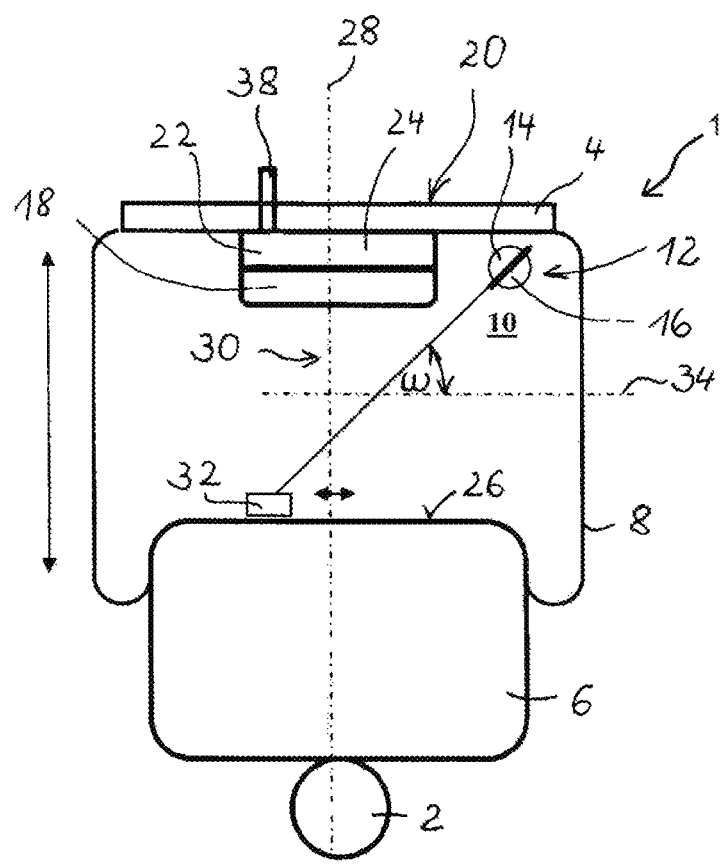
FIG. 1 is a schematic illustration of an embodiment of an air spring according to the invention.

The embodiment of an air spring 1 which is shown in FIG. 1 is one of a plurality of air springs of an air suspension device of a vehicle and is arranged between an axle 2 and a body (not shown here) of the vehicle. In such an air suspension device, a pressure medium is fed to or discharged from the air spring 1 as a function of a determined level of the air spring 1 in order to adjust a predefined setpoint level.

The air spring 1 includes a cover 4 which is connected, for example, to the body, a base element 6, for example in the form of a piston or a base plate, which is connected to the axle 2, and a flexible bellows 8 which is clamped in between them in a pressure-tight fashion. In the position of use of the air spring 1, the cover 4 is arranged at the top, and the piston 6 is arranged at the bottom. In the case of spring compression of the air spring 1, the vertical distance or the level between the cover 4 and the piston 6 decreases, and it increases in the case of spring extension.

The air spring 1 also has a level-measuring device 10 which, here, is preferably integrated completely into the bellows 8 and has the purpose of sensing the level of the air spring 1. The level-measuring device 10 contains, on the one hand, a rotational angle sensor 12 with a rotational element 14 and a base 16, with respect to which the rotational element 14 can be rotated. A rotational angle signal is generated as a function of the currently set rotational angle ω of the rotational element 14 with respect to the base 16 and is input into a evaluation device 18 which is preferably arranged in the interior of the bellows 8 and on the cover 4 of the air spring 1 in a unit 20. This unit 20 also accommodates a pressure sensor 22 for measuring the internal pressure in the bellows and an electronic control unit 24. For this purpose, at least one electrical feed through 38 is present in the cover 4 for feeding through electrical lines. The evaluation device 18 then assigns the angle signal, originating from the rotational angle sensor 12, to a level of the air spring 1. The rotational angle sensor 12 is preferably permanently connected here to the cover 4 of the air spring 1. Instead of being arranged inside the bellows 8 or inside the air spring 1, the evaluation device 18 can also be arranged outside them.

Here, the term "level" can be considered to be: (i) the distance of the cover 4 from an opposite piston face 26 of the piston 6 of the air spring 1, (ii) the length of the air spring 1 viewed in the direction of a vertical central axis 28 of the air spring 1, or (iii) the distance of the axle 2 of the vehicle from the body, depending on which of the specified variables appears more suitable for the further use, for example within the scope of a level-regulating algorithm.

Here, the rotational angle sensor 12 is arranged eccentrically with respect to the central axis 28 of the air spring 1. Alternatively, the rotational angle sensor 12 could also be arranged centrally. The rotational element 12 of the rotational angle sensor 12 can interact with the base 16 in a contactless fashion or by way of contact. Here, the rotational angle sensor 12 is preferably a rotational potentiometer in which the rotational element 14 is composed of a rotational slide which interacts with a conductor track of the base 16 and in which the electrical resistance changes in a measurable fashion with the rotational angle ω. Alternatively, it is also possible to provide a rotational angle sensor 12 with contactless interaction of the rotational element 14 with the base 16 such as, for example, a Hall element, an inductive rotational angle sensor or a rotational angle sensor according to the incremental transmitted light method. The rotational axis of the rotational element 14 of the rotational angle sensor 12 is preferably arranged here perpendicularly with respect to a vertical central plane of the air spring 1 which contains the central axis 28 of the air spring.

Provided in the bellows 8 is also a mechanical coupling 30, interacting, on the one hand, with the rotational element 14 of the rotational angle sensor 12 and, on the other hand, with an opposite piston face 26 of the piston 6, of the level-measuring device 10, in order to convert a linear relative movement between the cover 4 and the piston 6 into a rotational movement of the rotational element 14 of the rotational angle sensor 12. In other words, when the level of the air spring 1 changes, an angle of at least one element of the mechanical coupling 30 is to be changed, and the rotational angle sensor 12 is to generate an angle signal which is dependent on the change in angle of the element. Various embodiments relating to the mechanical coupling 30 are described below.

In the case of the preferred embodiment shown in FIG. 1, the mechanical coupling 30 is composed of a rod-shaped element which is guided in a sliding fashion by one of its ends in a, here, for example, linear guide 32 on the piston face 26, lying opposite the cover 4, of the piston 6, and is connected by its other end to the rotational element 14 of the rotational angle sensor 12. When the level of the air spring 1 changes, for example owing to a change in load or feeding in or discharging of compressed air, the one end of the rod element 30 then moves along the guide 32, as is indicated by the double arrow in FIG. 1, and the other end activates the rotational element 14 of the rotational angle sensor 12. The rotational angle ω, which is measured here, for example, relative to the horizontal 34, then changes. The linear guide 32 for the one end of the rod element 30 is preferably arranged here in a plane perpendicular to the central axis 28 of the air spring 1.

Figure 2:
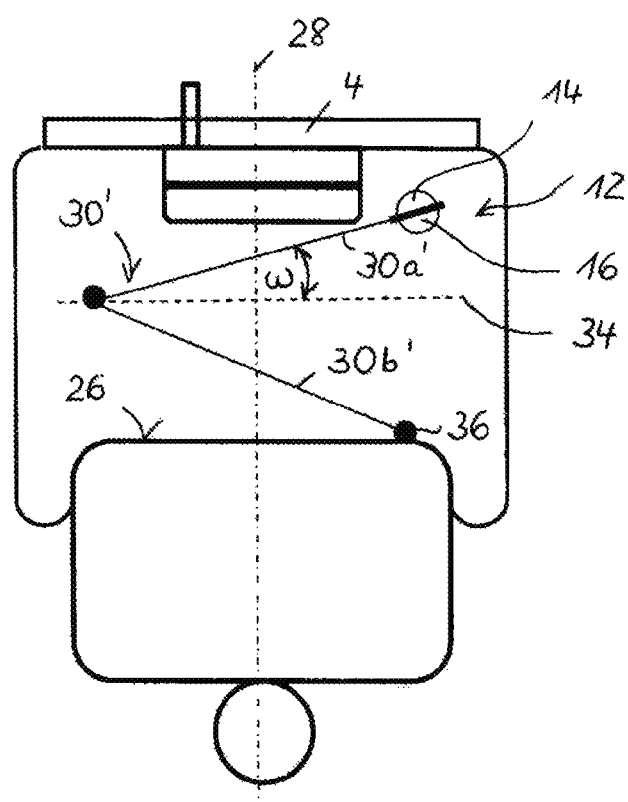
FIG. 2 is a schematic illustration of a further embodiment of an air spring according to the invention.

In the embodiment in FIG. 2, the mechanical coupling is composed of a scissor mechanism 30' with, for example, two scissor elements 30a', 30b' which are connected to one another in an articulated fashion and, for example, do not intersect, wherein one end of a first scissor element 30a' is coupled to the rotational element 14 of the rotational angle sensor 12, and a second scissor element 30b' is coupled via a linkage 36 to the piston face 26, lying opposite the cover 4, of the piston 6. On the other hand, the two scissor elements 30a', 30b' are connected to one another in an articulated fashion by their respective other ends, wherein the rotational axes of all the joints are parallel to one another. When the level of the air spring 1 changes, the scissor mechanism 30' then lengthens or shortens in the direction of the central axis 28 of the air spring 1, wherein the second scissor element 30b' rotates about the linkage 36, and the first scissor element 30a' activates the rotational element 14 of the rotational angle sensor 12, in order to change the rotational angle ω. Since there is preferably no provision here of telescopic scissor elements 30a', 30b' which could compensate stresses in the scissor mechanism 30', the range of springing of the air spring 1 is limited.

Figure 3:
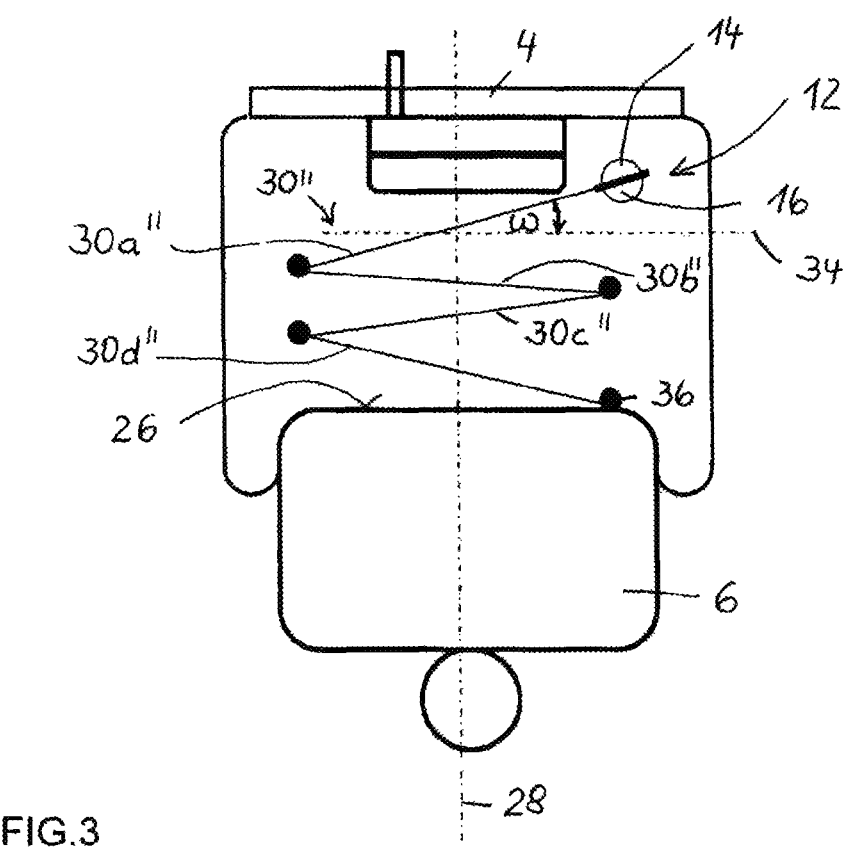
FIG. 3 is a schematic illustration of a yet further embodiment of an air spring according to the invention.

In the embodiment in FIG. 3, the scissor mechanism 30" is composed of four, for example, non-intersecting scissor elements 30a", 30b", 30c" and 30d". One end of a first scissor element 30a" is connected to the rotational element 14 of the rotational angle sensor 12, and one end of a fourth scissor element 30d" is coupled to the piston face 26, lying opposite the cover 4, of the piston 6 by way of a linkage 36. The four scissor elements 30a", 30b", 30c" and 30d" are also each coupled to one another in an articulated fashion by means of a joint, with the result that when the level of the air spring 1 changes, the scissor mechanism 30" then lengthens or shortens in the direction of the central axis 28 of the air spring 1. In this context, the fourth scissor element 30d" rotates about the linkage 36, and the first scissor element 30a" activates the rotational element 14 of the rotational angle sensor 12 in a rotating fashion, in order to change the rotational angle ω.

Figure 4:
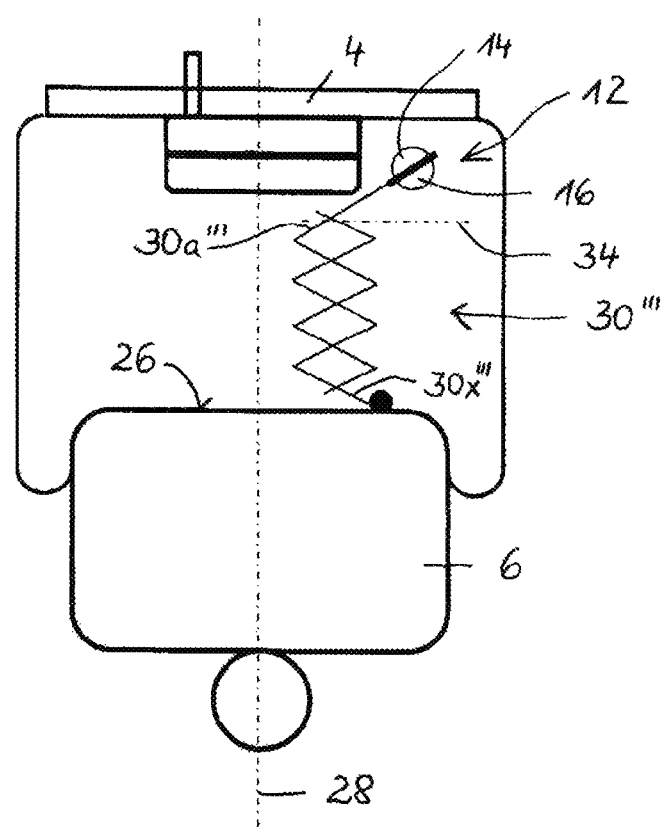
FIG. 4 is a schematic illustration of a preferred embodiment of an air spring according to the invention.

In the embodiment in FIG. 4, the scissor mechanism 30''' is composed of a multiplicity of intersecting scissor elements which are coupled to one another both centrally and at the ends. In turn, one end of a first scissor element 30''' is connected to the rotational element 14 of the rotational angle sensor 12 and one end of the last scissor element 30x''' is coupled by a linkage 36 to the piston face 26, lying opposite the cover 4, of the piston 6. When the level of the air spring 1 changes, the scissor mechanism 30''' then lengthens or shortens in the direction of the central axis 28 of the air spring. In this context, the last scissor element 30x''' rotates about the linkage on the piston 6, and the first scissor element 30a''' activates the rotational element 14 of the rotational angle sensor 12 in a rotating fashion in order to change the rotational angle ω.

In contrast to the embodiments described above, in the embodiment shown in FIGS. 5A to 5C, the mechanical coupling contains a telescopic device 30"" which is coupled by one of its ends to the piston face 26, lying opposite the cover 4, of the piston 6 by way of a linkage 36 and is connected by its other end to the rotational element 14 of the rotational angle sensor 12. This telescopic device 30"" contains here, for example, two telescopic elements 30a"" and 30b"" which can slide relative to one another with a longitudinal degree of freedom, as is indicated by the double arrow. In this context, a first telescopic element 30a"" is connected to the rotational element 14 of the rotational angle sensor 12, and the second telescopic element 30b"" is connected to the piston 6 via the linkage 36. When the level of the air spring 1 changes with the lengthening or shortening of the telescopic device 30"", the one end of the second telescopic element 30b"" then rotates about the linkage 36, and the one end of the first telescopic element 30a"" activates the rotational element 14 of the rotational angle sensor 12 in order to change the angle ω.

Figure 5A:
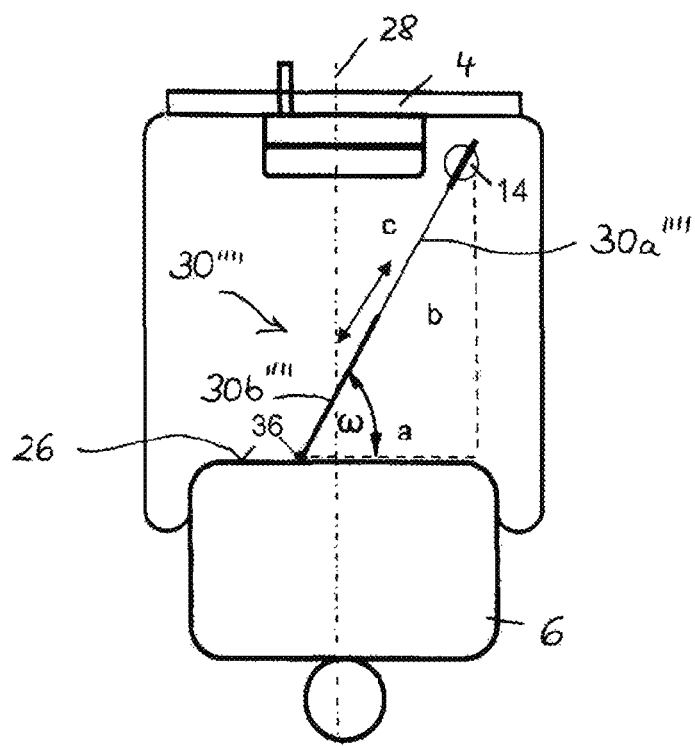
FIGS. 5A to 5C are schematic illustrations of a further preferred embodiment of an air spring according to the invention in various spring compression positions.
Figure 5B:
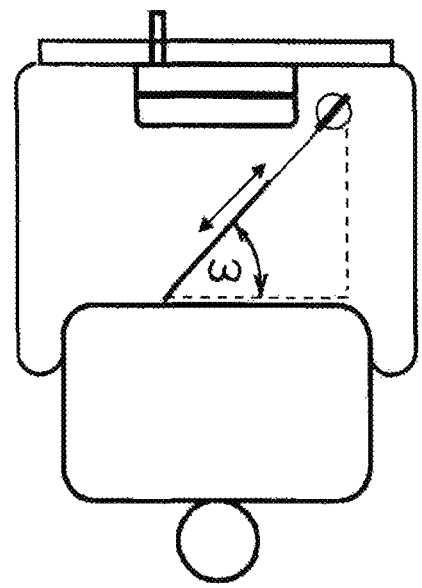
Figure 5C:
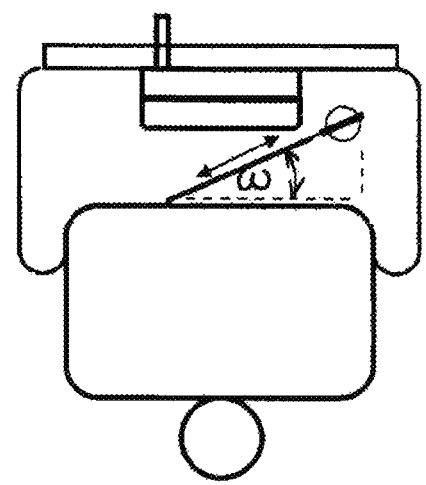

In this context, FIG. 5A shows an initial position between the cover 4 and the piston 6 of the air spring 1, FIG. 5B shows a position in which the distance between the cover 4 and the piston 6 is reduced and FIG. 5C shows a situation in which the distance between the cover 4 and piston 6 is reduced even further. In the course of the associated reduction in the level of the air spring, which is symbolized by the letter b in FIGS. 5A to 5C, the length c of the telescopic device 30"" is reduced, and the measure a as a projection of the length c onto the piston 6 or onto the piston face 26 increases.

It is clear that the rotational angle sensor 12 can also be connected to the piston 6 instead of to the cover 4, and that the guide 32 or the linkage 36 for the mechanical coupling 30 is then connected to the cover 4. The evaluation device 18 can also be arranged outside the bellows 8, wherein electrical leads then have to be extended between the rotational angle sensor 12 and the evaluation device 18 through the feed through 38 which is formed, for example, on the cover 4.

LIST OF REFERENCE NUMBERS

1 Air spring
2 Axle
4 Cover
6 Piston
8 Bellows
10 Level-measuring device
12 Rotational angle sensor
14 Rotational element
16 Base
18 Evaluation device
20 Unit
22 Pressure sensor
24 Electronic control unit
26 Piston face
28 Central axis
30 Mechanical coupling
32 Guide
34 Horizontal
36 Linkage
38 Feed through The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air spring, comprising:
    a cover;
    a base element;
    a flexible bellows clamped in a pressure-tight manner between the cover and the base element; and
    a level-measuring device integrated at least partially into the bellows, the level-measuring device sensing a level of the air spring, wherein the level-measuring device comprises:
    an angle sensor integrated into the bellows and connected at least in a rotationally fixed manner to the cover or the base element, the angle sensor comprising a base and an element rotatable relative to the base;
    a mechanical coupling connected, on one hand, to the rotatable element of the angle sensor and, on another hand, to the cover or the base element, such that when the level of the air spring changes, an angle of a component of the mechanical coupling is changed, and the angle sensor generates an angle signal dependent on the change in the angle; and
    an evaluation device by which the angle signal originating from the angle sensor is assigned to a level of the air spring,
    wherein the mechanical coupling comprises:
    a scissor mechanism having at least two scissor elements connected to one another in an articulated fashion, wherein
    one end of a first scissor element is connected to the rotatable element of the angle sensor,
    one end of a second scissor element is coupled via a linkage to the base element or to the cover, such that when the level of the air spring changes the scissor mechanism lengthens or shortens viewed in a direction of the central axis of the air spring, and
    the second scissor element rotates about the linkage and the first scissor element activates the rotatable element of the angle sensor.

2. The air spring according to claim 1, wherein the mechanical coupling comprises:
    a first element having ends, one end being guided in a sliding manner in a guide on the base element or on the cover, and another end being connected to the rotatable element of the angle sensor, wherein when the level of the air spring changes, the one end is moved along the guide and the another end activates the rotatable element of the angle sensor.

3. The air spring according to claim 2, wherein the guide is a linear longitudinal guide arranged in a plane that is perpendicular to a central axis of the air spring.

4. The air spring according to claim 1, wherein the scissor mechanism comprises intersecting and/or non-intersecting scissor elements.

5. The air spring according to claim 1, wherein the evaluation device is integrated into the bellows and is arranged on the cover.

6. The air spring according to claim 1, wherein the angle sensor is arranged centrally or eccentrically with regard to a central axis of the air spring.

7. The air spring according to claim 1, wherein the rotatable element of the angle sensor interacts with the base of the angle sensor in a contactless manner.

8. The air spring according to claim 1, wherein the rotatable element of the angle sensor interacts with the base of the angle sensor via contact.

9. The air spring according to claim 1, wherein the rotational axis of the rotatable element of the angle sensor is arranged perpendicular to a central plane that contains a central axis of the air spring.

10. An air suspension device for a vehicle, comprising:
at least one air spring, the air spring comprising:
a cover;
a base element;
a flexible bellows clamped in a pressure-tight manner between the cover and the base element; and
a level-measuring device integrated at least partially into the bellows, the level-measuring device sensing a level of the air spring, wherein the level-measuring device comprises:
an angle sensor integrated into the bellows and connected at least in a rotationally fixed manner to the cover or the base element, the sensor comprising a base and an element rotatable relative to the base;
a mechanical coupling connected, on one hand, to the rotatable element of the angle sensor and, on another hand, to the cover or the base element, such that when the level of the air spring changes, an angle of a component of the mechanical coupling is changed, and the angle sensor generates an angle signal dependent on the change in the angle; and
an evaluation device by which the angle signal originating from the angle sensor is assigned to a level of the air spring,
wherein the mechanical coupling comprises:
a scissor mechanism having at least two scissor elements connected to one another in an articulated fashion, wherein
one end of a first scissor element is connected to the rotatable element of the angle sensor,
one end of a second scissor element is coupled via a linkage to the base element or to the cover, such that when the level of the air spring changes the scissor mechanism lengthens or shortens viewed in a direction of the central axis of the air spring, and
the second scissor element rotates about the linkage and the first scissor element activates the rotatable element of the angle sensor.

11. The air suspension device according to claim 10, wherein the mechanical coupling comprises:
a first element having ends, one end being guided in a sliding manner in a guide on the base element or on the cover, and another end being connected to the rotatable element of the angle sensor, wherein when the level of the air spring changes, the one end is moved along the guide and the another end activates the rotatable element of the angle sensor.

12. The air suspension device according to claim 11, wherein the guide is a linear longitudinal guide arranged in a plane that is perpendicular to a central axis of the air spring.

13. The air suspension device according to claim 10, wherein the scissor mechanism comprises intersecting and/or non-intersecting scissor elements.

14. The air suspension device according to claim 10, wherein the evaluation device is integrated into the bellows and is arranged on the cover.

15. An air spring, comprising:
a cover;
a base element;
a flexible bellows clamped in a pressure-tight manner between the cover and the base element; and
a level-measuring device integrated at least partially into the bellows, the level-measuring device sensing a level of the air spring, wherein the level-measuring device comprises:
an angle sensor integrated into the bellows and connected at least in a rotationally fixed manner to the cover or the base element, the angle sensor comprising a base and an element rotatable relative to the base;
a mechanical coupling connected, on one hand, to the rotatable element of the angle sensor and, on another hand, to the cover or the base element, such that when the level of the air spring changes, an angle of a component of the mechanical coupling is changed, and the angle sensor generates an angle signal dependent on the change in the angle; and
an evaluation device by which the angle signal originating from the angle sensor is assigned to a level of the air spring,
wherein the mechanical coupling comprises:
a telescopic device coupled by one end to the cover or to the base element via a linkage, and connected by another end to the rotatable element of the angle sensor, wherein when the level of the air spring changes the telescopic device lengthens or shortens with the one end rotating about the linkage and the another end activating the rotatable element of the angle sensor, and
wherein the telescopic device comprises at least two elements slidable relative to one another with a longitudinal degree of freedom.

16. An air suspension device for a vehicle, comprising:
at least one air spring, the air spring comprising:
a cover;
a base element;
a flexible bellows clamped in a pressure-tight manner between the cover and the base element; and
a level-measuring device integrated at least partially into the bellows, the level-measuring device sensing a level of the air spring, wherein the level-measuring device comprises:
an angle sensor integrated into the bellows and connected at least in a rotationally fixed manner to the cover or the base element, the sensor comprising a base and an element rotatable relative to the base;
a mechanical coupling connected, on one hand, to the rotatable element of the angle sensor and, on another hand, to the cover or the base element, such that when the level of the air spring changes, an angle of a component of the mechanical coupling is changed, and the angle sensor generates an angle signal dependent on the change in the angle; and
an evaluation device by which the angle signal originating from the angle sensor is assigned to a level of the air spring,
wherein the mechanical coupling comprises:
a telescopic device coupled by one end to the cover or to the base element via a linkage, and connected by another end to the rotatable element of the angle sensor, wherein when the level of the air spring changes the telescopic device lengthens or shortens with the one end rotating about the linkage and the another end activating the rotatable element of the angle sensor, and
wherein the telescopic device comprises at least two elements slidable relative to one another with a longitudinal degree of freedom.

\* \* \* \* \*